(12) United States Patent
Ricard et al.

(10) Patent No.: US 10,659,160 B2
(45) Date of Patent: May 19, 2020

(54) SLIP RING

(71) Applicant: THALES, Courbevoie (FR)

(72) Inventors: Michel Ricard, Sophia Antipolis (FR); Antoine Caplain, Sophia Antipolis (FR); Olivier Fassy, Sophia Antipolis (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/334,348

(22) PCT Filed: Sep. 19, 2017

(86) PCT No.: PCT/EP2017/073680
§ 371 (c)(1),
(2) Date: Mar. 18, 2019

(87) PCT Pub. No.: WO2018/054923
PCT Pub. Date: Mar. 29, 2018

(65) Prior Publication Data
US 2019/0215067 A1    Jul. 11, 2019

(30) Foreign Application Priority Data

Sep. 20, 2016  (FR) ..................................... 16 01366

(51) Int. Cl.
*H04B 10/00* (2013.01)
*H04B 10/25* (2013.01)
(Continued)

(52) U.S. Cl.
CPC ....... *H04B 10/2504* (2013.01); *G02B 6/3604* (2013.01); *G02B 6/4201* (2013.01); *H04B 10/22* (2013.01)

(58) Field of Classification Search
CPC .... H04B 10/80; H04B 10/801; H04B 10/802; H04B 10/803; H04B 10/806; H04B 10/808; G02B 6/3604
See application file for complete search history.

(56) References Cited

U.S. PATENT DOCUMENTS 4,401,360 A * 8/1983 Streckmann ......... G02B 6/3604
250/227.11
5,016,961 A * 5/1991 Aldrich ................ H04B 10/801
250/551
(Continued)

FOREIGN PATENT DOCUMENTS

DE    27 45 770 A1    4/1979
DE    34 09 809 A1    9/1985
(Continued)

*Primary Examiner* — Daniel G Dobson
(74) *Attorney, Agent, or Firm* — Baker & Hostetler LLP (57) ABSTRACT

A slip ring for optical fibers includes a first part and a second part that is able to rotate with respect to the first part, the slip ring comprising at least one data transmission channel comprising an optical/electrical converter for transforming an optical signal conveyed by an optical fiber into a first electrical signal, at least one optical emitter, receiving the first electrical signal so as to emit a light beam, at least one optical detector for detecting the light beam and for transforming it into a second electrical signal, the emitter being contained in the first part and the detector being contained in the second part, or vice versa, and an electrical/optical converter to which the second electrical signal is transmitted such that the electrical/optical converter generates another optical signal intended to be conveyed on another optical fiber.

29 Claims, 3 Drawing Sheets

(51) Int. Cl.
*G02B 6/36* (2006.01)
*G02B 6/42* (2006.01)
*H04J 14/00* (2006.01)

(56) References Cited

U.S. PATENT DOCUMENTS

| | | |
|---|---|---|
| 5,553,176 A | 9/1996 | Demarco, Jr. |
| 2004/0012471 A1* | 1/2004 | Kojima .................. H01F 38/18 336/120 |

FOREIGN PATENT DOCUMENTS

| | | |
|---|---|---|
| DE | 40 34 578 A1 | 5/1992 |
| DE | 10 2014 225097 A1 | 6/2016 |
| EP | 0 045 585 A1 | 2/1982 |
| JP | 2012-119890 A | 6/2012 |

* cited by examiner

SLIP RING

CROSS-REFERENCE TO RELATED APPLICATIONS

This application is a National Stage of International patent application PCT/EP2017/073680, filed on Sep. 19, 2017, which claims priority to foreign French patent application No. FR 16/01366, filed on Sep. 20, 2016, the disclosures of which are incorporated by reference in their entirety.

FIELD OF THE INVENTION

The invention relates to slip rings for optical fibers for transferring data contactlessly from a first optical fiber to another optical fiber that is able to rotate about an axis of rotation with respect to the first optical fiber.

BACKGROUND

It applies notably, but not solely, to the field of underwater surveillance in which one or more sensors, possibly contained in an antenna, are towed by a craft. Optical fibers are conventionally used to feed back measurements obtained by the sensor(s) on board the craft. Optical fibers have the advantage of making it possible to convey data without a significant loss, with a high bit rate of the order of several hundred megabits per second over a significant distance, possibly ranging up to several hundred meters.

A towed antenna or a sensor is conventionally placed in water and brought back on board the craft by way of a winch situated on board the craft. The winch comprises a structure that is fixed to the craft and a drum that is intended to rotate about an axis of the winch with respect to the structure. Feeding back data by way of optical fibers requires equipping the winch with a slip ring for optical fibers. This slip ring makes it possible to transmit the data from a first optical fiber (rotor fiber) linked to the drum rotating about the axis of the winch to another optical fiber (stator fiber) linked to the structure of the winch rotating about the axis of the winch.

A contactless slip ring for optical fibers is known. The contactless slip ring allows contactless data transmission from a fixed part of the slip ring, linked to a stator fiber, to a rotating part of the slip ring, linked to a rotor fiber, so as to allow data communication between the rotor fiber and the stator fiber. The contactless slip ring from the prior art is configured so as to place the stator fiber and the rotor fiber facing one another. Contactless data transmission makes it possible to avoid the problems of transmission degradation linked to the mechanical wear of the components. This solution is simple and relatively inexpensive but limited to a single pair of rotor and stator fibers. For example, it is not suitable for providing multi-fiber data transmission, that is to say from a plurality of optical fibers to a plurality of other optical fibers.

A slip ring comprising a Dove prism interposed between rotor and stator optical fibers, allowing multi-fiber data transmission from two rotor optical fibers to two stator optical fibers, is also known. However, a significant insertion loss is unfortunately present on one of the two optical transmission channels.

Another solution for multi-fiber optical transmission consists of a slip ring comprising, for each rotor fiber-stator fiber pair, an optical/electrical transducer for converting a signal conveyed by a rotor optical fiber into an electrical signal, a capacitive slip ring comprising an electrode linked to the fixed part of the slip ring and an electrode linked to the rotating part, which are coupled capacitively so as to transmit the electrical data from the fixed part to the rotating part of the slip ring, and an electrical/optical converter for converting the electrical data originating from the capacitive slip ring into an optical signal injected into the stator fiber. In this case, the two data transmission channels exhibit limited data transmission losses, but the capacitive slip rings remain expensive.

SUMMARY OF THE INVENTION

Another less expensive solution consists of a slip ring comprising, for each rotor fiber-stator fiber pair, an optical/electrical converter for converting the data conveyed by a rotor fiber into an electrical signal, means for transmitting/receiving a radiofrequency signal, for example of Wi-Fi type, from the fixed part to the rotating part of the means for receiving the radiofrequency signal, and an electrical/optical converter for converting the signal originating from the means for receiving the radio signal into an optical signal that is injected into the stator fiber. However, this solution has a bit rate limited to around 50 Mbits/s and may lead to electromagnetic interference (EMI) that is incompatible with military applications.

One aim of the invention is to limit or mitigate at least one of the abovementioned drawbacks.

To this end, one subject of the invention is a slip ring comprising a first part and a second part that is able to rotate with respect to the first part, said slip ring comprising at least one data transmission channel comprising an optical/electrical converter for transforming an optical signal conveyed by an optical fiber into a first electrical signal, at least one optical emitter, receiving the first electrical signal so as to emit a light beam, at least one optical detector for detecting the light beam and for transforming it into a second electrical signal, the emitter being contained in the first part and the detector being contained in the second part, or vice versa, and an electrical/optical converter to which the second electrical signal is transmitted such that said electrical/optical converter generates another optical signal intended to be conveyed on another optical fiber.

The slip ring according to the invention advantageously comprises at least one of the features below, taken alone or in combination:

the first part is able to rotate with respect to the second part about an axis of rotation x, the first part and the second part being remote from one another along the axis of rotation x, the optical emitter is arranged so as to emit a light beam directed substantially parallel to the axis of rotation, the slip ring comprises a plurality of data transmission channels.

Advantageously, the data transmission channels comprise a plurality of data transmission channels, called main channels, wherein the emitters of the respective main channels are configured so as to emit light beams having respective emission peaks at different respective emission wavelengths or so as to emit light beams in separate respective emission wavelength bands.

In other words, each emitter of one and the same main channel is configured so as to emit a light signal at one and the same wavelength or in one and the same frequency band. Therefore, if a main channel comprises a plurality of emitters, these emitters are configured so as to emit a light signal at one and the same wavelength or in one and the same frequency band. By contrast, the emitters of the various main channels are configured so as to emit light beams having emission peaks at different emission wavelengths or so as to emit light beams in separate emission wavelength bands.

Advantageously, the optical detectors of the respective main channels are configured so as to deliver respective second electrical signals originating mainly from the radiation of the optical emitters of the respective main channels.

In other words, each detector of one and the same main channel is configured so as to deliver an electrical signal that originates mainly from the beam or the beams emitted by the emitter or emitters of this same main channel. If a main channel comprises a plurality of optical detectors, these detectors are configured so as to deliver an electrical signal that originates mainly from the beam or the beams emitted by the emitter or emitters of this same main channel. The electrical signals delivered by the detectors of the various main channels mainly originate from the beams emitted by the emitters of the various main channels.

In one particular exemplary embodiment, each main channel comprises a single optical emitter and a single optical detector.

The slip ring according to the invention advantageously comprises at least one of the features below, taken alone or in combination with one another or with at least one of the above features:

the slip ring comprises at least one main channel and a redundant channel associated with the main channel, and a selector for selecting a channel from among the main channel and the redundant channel so as to transmit data from the first part to the second part, or vice versa, solely by way of the selected channel, the slip ring comprises a plurality of optical emitters and a plurality of optical detectors that are distributed over the first part and the second part so as to allow bidirectional data communication between the first part and the second part, the slip ring comprises at least one data transmission channel in which an optical emitter is arranged so as to emit a light beam that intercepts a photosensitive zone of at least one optical detector of said data transmission channel regardless of the relative position between the first part and the second part about the axis of rotation from among the possible relative positions between the first part and the second part about the axis of rotation, the slip ring comprises a single optical emitter and a single optical detector, the optical emitter being arranged so as to emit a light beam directed substantially parallel to the axis of rotation and the optical detector comprising a photosensitive surface intersecting the axis of rotation, the first part is able to rotate with respect to the second part about an axis of rotation, and at least one data transmission channel comprises an optical emitter arranged so as to emit a light beam that intercepts a photosensitive surface of the detector of said data transmission channel only for a sub-portion of the possible relative positions between the first part and the second part about the axis of rotation, the slip ring comprises a computer configured so as to compute a rotational speed of the first part with respect to the second part as a function of the aperture of the light beam emitted by the emitter of the channel, of the relative position of the emitter and of the detector along the axis of rotation, of their respective orientations, of the duration of illumination of the detector by the emitter and of the duration between two successive illuminations of the detector by the emitter, the slip ring comprises a power slip ring for transferring electrical energy from the first part to the second part or vice versa, the power slip ring comprises a transformer comprising a first winding and a second winding that are magnetically coupled and contained in the first part and the second part, respectively, or vice versa, so as to allow energy to be transferred from the first part to the second part or vice versa, the transformer comprises a third winding and a fourth winding that are magnetically coupled and contained in the first part and the second part, respectively, or vice versa, so as to allow data to be transferred from the first part to the second part or vice versa, the transformer comprises a magnetic circuit on which the first winding and the second winding are installed, the magnetic circuit comprising an air gap in which the third winding and the fourth winding are positioned, the second part is able to move in relation to the first part about an axis of rotation x, the third winding being formed in a plane substantially perpendicular to the axis of rotation and the fourth winding is formed in another plane substantially perpendicular to the axis of rotation.

The invention also relates to a measurement assembly comprising a sensor and a slip ring according to the invention comprising at least one data transmission channel, the optical fiber, the signal conveyed by the optical fiber being generated from a measurement originating from the sensor, said sensor being supplied with electric power by way of electrical energy delivered by the transformer. The invention also relates to an assembly comprising a slip ring for optical fibers according to the invention, said assembly comprising the optical fiber and the other optical fiber. In other words, each channel is coupled to an optical fiber so as to transform an optical signal coming from this optical fiber, and to another optical fiber so as to generate the optical signal that will be conveyed by this other optical fiber. The optical fibers coupled to the various channels are separate, and the other optical fibers coupled to the various channels are separate.

The invention also relates to a slip ring comprising a plurality of main channels as well as the optical fibers and the other optical fibers coupled to the various main channels.

BRIEF DESCRIPTION OF THE DRAWINGS

The invention will be better understood on studying a few embodiments described by way of completely non-limiting example and illustrated by appended drawings, in which.

From one figure to another, the same elements are denoted using the same reference numbers.

DETAILED DESCRIPTION

The invention relates to a slip ring for optical fibers. A first embodiment of a slip ring according to the invention is shown schematically in FIG. 1. The slip ring comprises a first part 10 and a second part 20 that are able to rotate with respect to one another, as shown by the arrow in FIG. 1. The first part 10 may be a fixed part and the second part 20 may be a rotating part, or vice versa.

Figure 1:
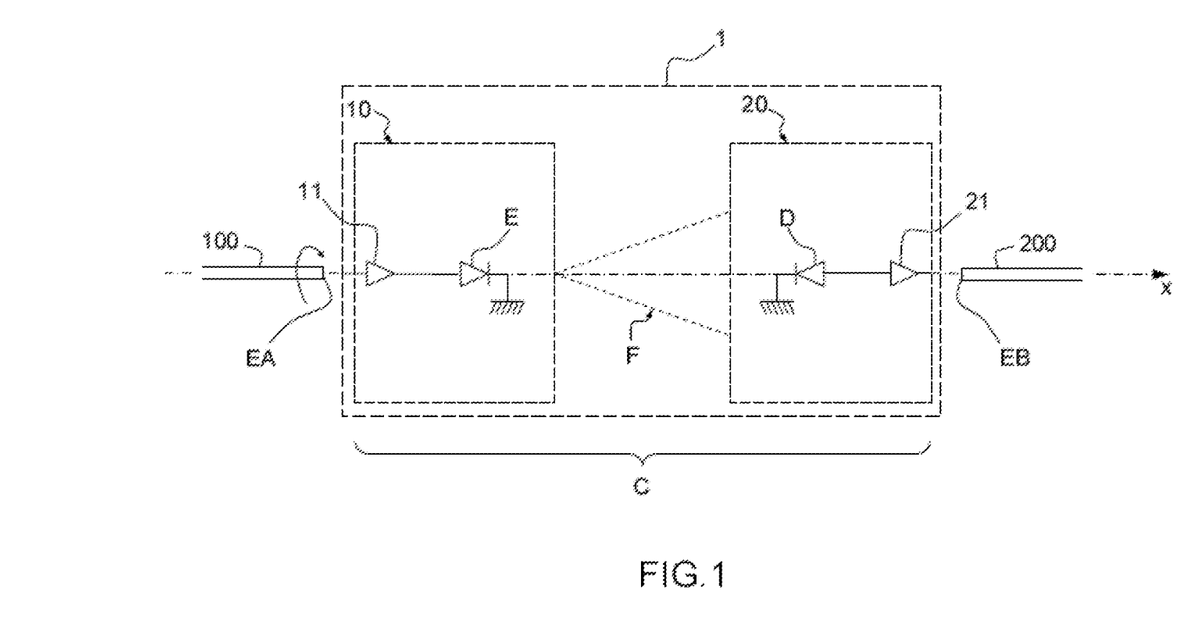
FIG. 1 schematically shows a slip ring according to a first embodiment of the invention, FIG. 2 schematically shows a slip ring according to a second embodiment of the invention, FIG. 3 schematically shows a slip ring according to a third embodiment of the invention.

The contactless slip ring for optical fibers 1 is intended to interact with optical fibers so as to receive a first optical signal delivered by a first optical fiber 100 and is intended to communicate a second optical signal, generated from the first signal, to a second optical fiber 200. This is achieved by contactlessly communicating data from the part first part 10 to the second part 20. The first fiber 100 is intended to be fixed to the first part 10 and the second optical fiber 200 is intended to be fixed to the second part 20. Advantageously, the two parts 10, 20 comprise reception means intended to receive one or more first optical fibers and one or more second optical fibers.

In order to transfer data from the first optical fiber 100 to the second optical fiber 200 or vice versa, the slip ring 1 for optical fibers according to the invention comprises a data transmission channel C comprising an optical/electrical converter 11 for transforming an optical signal conveyed by one of the optical fibers 100, 200 into a first electrical signal, at least one optical emitter E supplied with power by way of the first electrical signal so as to emit an optical or light beam representative of the first electrical signal, at least one optical detector D for detecting the optical beam emitted by the emitter E and for transforming it into a second electrical signal, and an electrical/optical converter 21 receiving the second electrical signal and generating, from the second electrical signal, another optical signal intended to be conveyed on the other optical fiber 200 or 100, respectively. In the non-limiting example of FIG. 1, the transmission channel makes it possible to communicate data from the first optical fiber 100 to the second optical fiber 200. The first part 10 comprises the optical emitter E and advantageously the optical/electrical converter 11. The second part 20 comprises the optical detector D and advantageously the electrical/optical converter 21. This makes it possible to contactlessly and optically communicate data from the first part 10 to the second part 20. Moreover, the optical/electrical converter 11 makes it possible to transform an optical signal conveyed by the first optical fiber 100 into the first electrical signal, and the electrical/optical converter 21 makes it possible to generate, from the second electrical signal delivered by the detector D, the other optical signal intended to be conveyed on the second optical fiber 200.

The slip ring may comprise a data transmission channel for communicating data from the second optical fiber 200 to the first optical fiber 100. In this case, the second part 20 comprises the optical emitter or emitters of the latter channel and the first part comprises the optical detector or detectors of the latter channel. Advantageously, the first part 10 comprises the electrical/optical converter 21 and the second part comprises the optical/electrical converter 11 of this same channel.

The optical emitter E is an optoelectronic emitter. It is for example a light-emitting diode (LED) or a laser diode. The electromagnetic radiation is emitted in a predetermined emission frequency band or preferably at a predetermined emission wavelength. The emission frequency band or the wavelength are contained within a frequency band ranging from the infrared to the ultraviolet, passing through visible light.

The optical detector D is able to detect a light beam or optical beam. It comprises a photodiode, for example. In the slip ring 1 according to the invention, the data are transmitted optically and contactlessly from the first part 10 to the second part 20 (or vice versa) for the purpose of transmitting signals from optical fiber to optical fiber. The light beam emitted by the optical emitter E is electromagnetic radiation emitted in a frequency band ranging from the infrared to the ultraviolet. Therefore, this radiation does not exhibit the drawbacks of transmitting data via radio waves. The slip ring according to the invention is simple, inexpensive and compact. It allows data transmission at a very high bit rate greater than or equal to 100 Mbits/second, possibly even reaching up to 1 Gbits/second due to the existence of emitters and optical detectors that may exhibit these bit rates, for example light-emitting diodes and photodiodes.

Moreover, the slip ring according to the invention allows multi-fiber or multi-channel data transmission by making provision for a plurality of transmission channels that are intended to be coupled to first optical fibers and separate respective second optical fibers. This multi-fiber or multi-channel transmission makes it possible to transmit the same data redundantly or separate data on a plurality of channels in a simple, compact and inexpensive manner. This solution exhibits good energy efficiency. In particular, this solution does not lead to unequal losses in the channels. Moreover, this solution does not generate magnetic interference in the environment.

The solution that is proposed does not require the imposition of a short distance between the emitter E and the detector D. A distance comparable to those of remote controllers of domestic appliances, of the order a few meters, is acceptable.

Advantageously, as shown in FIG. 1, the first part 10 is able to rotate with respect to the second part 20 about an axis of rotation x.

As is visible in FIG. 1, the slip ring 1 is interposed between the first fiber 100 and the second fiber 200 along the axis of rotation x. In other words, the first part 10 and the second part 20 are interposed between the first fiber 100 and the second fiber 200 along the axis of rotation x. More precisely, the slip ring 1 is interposed between the end EA of the first fiber 100 that is intended to face the slip ring and the end EB of the second optical fiber 200 that is intended to face the slip ring.

Advantageously, the rotating part 10 and the fixed part 20 are remote from one another along the axis of rotation x. Advantageously, the first part 10 is positioned on one side of a plane perpendicular to the axis of rotation x and the second part is positioned on the other side of this plane. In other words, the two parts 10 and 20 are separated by this plane perpendicular to the axis x.

The transmission channel C shown in FIG. 1 comprises an emitter E and a detector D. Advantageously, the emitter E and the detector D are arranged so as to emit a beam in an emission zone covering a photosensitive zone of the optical detector D regardless of the relative position between the first part 10 and the second part 20 about the axis of rotation x from among the possible relative positions between these two parts about the axis. This makes it possible to continuously transmit information from the first part to the second part.

In the example shown in FIG. 1, the optical emitter E is arranged so as to emit a light beam F directed along an emission axis that is substantially parallel to the axis of rotation x. Advantageously, the light beam F is emitted substantially along the axis of rotation x. In other words, the light beam is substantially rotationally symmetrical about the axis x. Advantageously, the detector D has a photosensitive surface intersecting the axis of rotation. This embodiment is particularly advantageous because it allows continuous data transmission from the optical emitter E to the optical detector D, since the optical detector D is continuously illuminated by the optical emitter regardless of the relative position of the two parts 10 and 20 about the axis of rotation x. This continuous data transmission is achieved in a simple manner. It does not require complex processing to be implemented on the transmitted data.

Advantageously, the optical detector D has a photosensitive surface that is substantially perpendicular to the axis of rotation and substantially centered on said axis of rotation. This feature makes it possible to maximize the reception surface and therefore the energy received by the photodiode.

However, it is possible to achieve continuous transmission of information from the first part 10 to the second part 20 without the emission axis of the emitter E being coincident with the axis x and without the photosensitive surface of the detector D being perfectly perpendicular and centered on the axis x. There is a certain positioning and orientation tolerance for these elements.

As a variant, the slip ring comprises at least one transmission channel comprising a plurality of emitters and/or a plurality of detectors. This arrangement makes it possible, when the emitter(s) and/or detector(s) are remote from the axis of rotation, to limit phenomena of masking of an emitter by a detector when the first part 10 of the slip ring 1 rotates with respect to the second part 20. This makes it possible to limit risks of discontinuity of the data communication from the first part to the second part.

Figure 2:
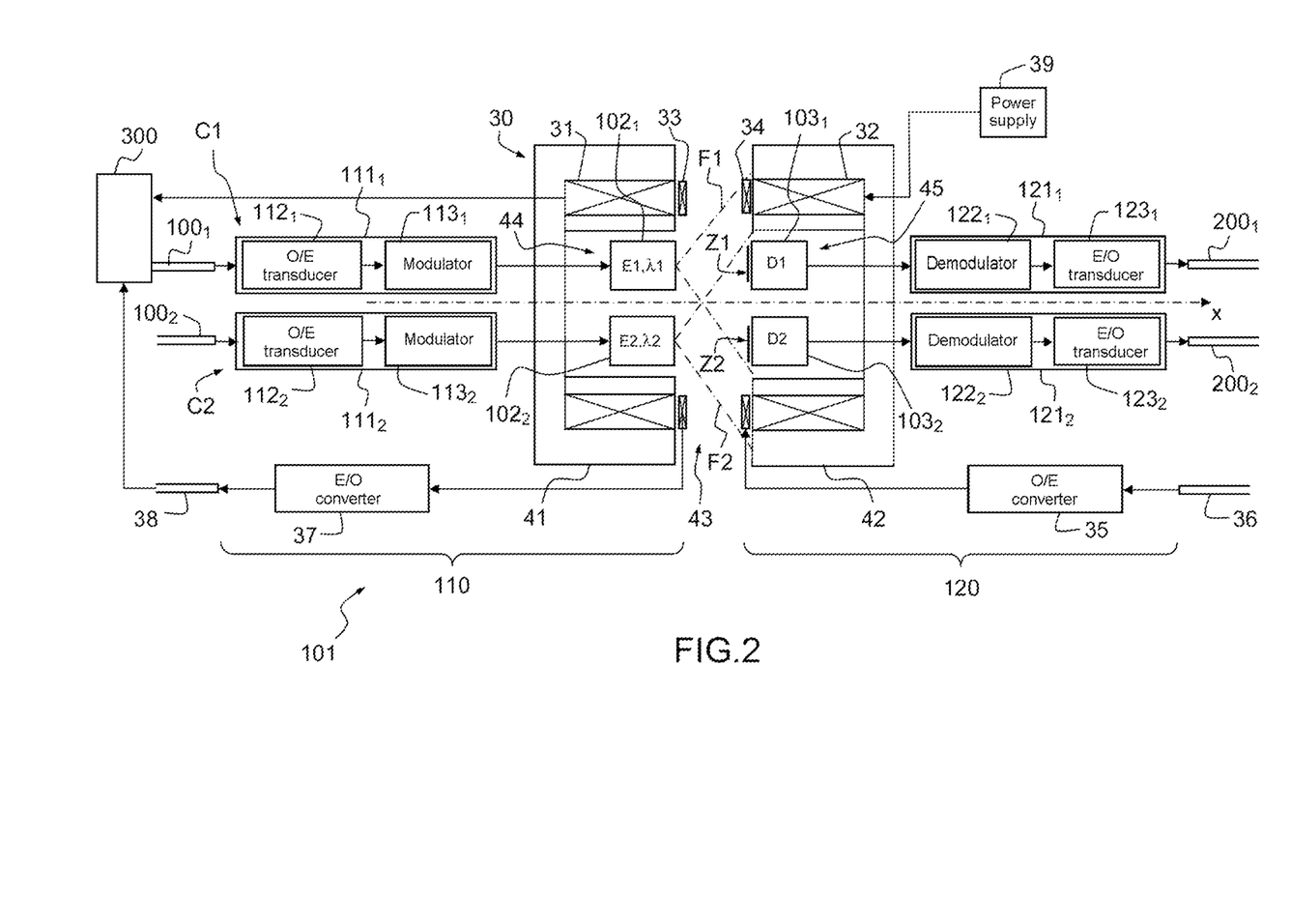
Figure 3:
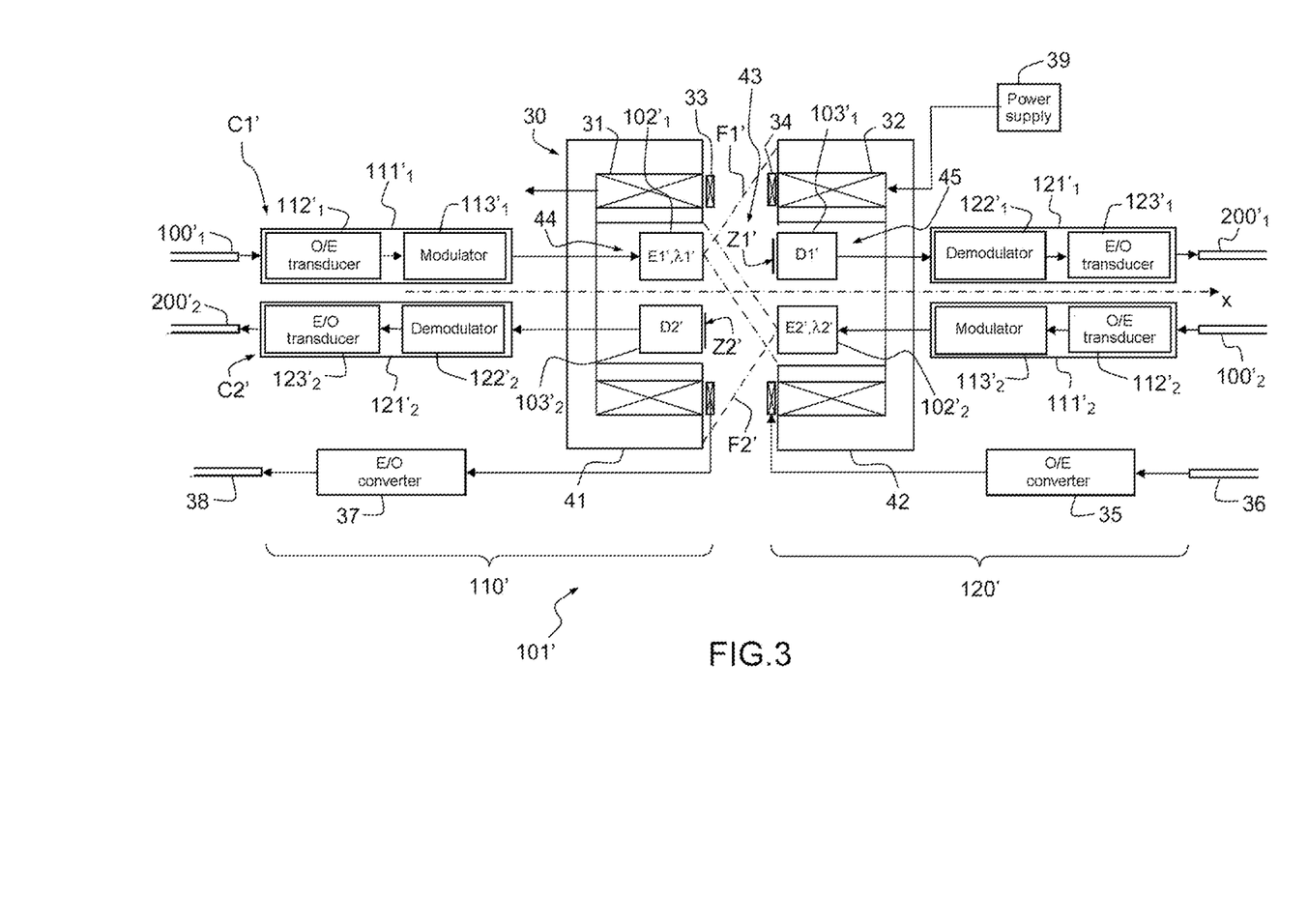

FIGS. 2 and 3 show other embodiments of slip rings for optical fibers comprising a plurality of data transmission channels such as defined above. In the non-limiting examples of these figures, the slip rings comprise two transmission channels. The assemblies shown in these figures comprise two first optical fibers that are respectively coupled to a first transmission channel and to a second channel, and two second optical fibers that are respectively coupled to a first transmission channel and to a second transmission channel. Each transmission channel comprises at least one optical emitter and one optical detector.

In the embodiment of FIG. 2, the slip ring comprises a plurality of optical emitters E1, $102_1$, E2, $102_2$ and a plurality of optical detectors D1, $103_1$, D2, $103_2$, contained in the first part 110 and the second part 120 of the slip ring 101. These emitters and receivers are arranged and configured such that the slip ring 101 for optical fibers has a plurality of data transmission channels such as defined above. In the embodiment of FIG. 2, the slip ring for optical fibers comprises, without limitation, two data transmission channels C1, C2. Each data transmission channel C1, C2 comprises one of the emitters E1 or E2 and one of the detectors D1 or D2. As a variant, at least one of the transmission channels comprises a plurality of emitters and/or a plurality of detectors.

In the embodiment of FIG. 2, all of the emitters E1, E2 are positioned on the first part 110 and all of the detectors D1, D2 are positioned on the second part 120. This means that all of the data transmission channels are intended to emit data in the same direction. In this case, the data are transmitted from the first part 110 to the second part 120. The data transmission by way of the emitters and receivers is performed unidirectionally in the embodiment of FIG. 2.

Each channel also comprises an optical/electrical converter $111_1$, $111_2$ and an electrical/optical converter $121_1$, $121_2$ as defined above, intended to be coupled respectively to a first optical fiber $100_1$, $100_2$ and to a second optical fiber $200_1$, $200_2$. In other words, each channel comprises an optical/electrical converter $111_1$, $111_2$ and an electrical/optical converter $121_1$, $121_2$ that is specific thereto. These converters are not common to the various channels. The converters of the various channels are separate. The respective channels C1, C2 are intended to be optically coupled to respective first optical fibers $100_1$, $100_2$ and to respective second optical fibers $200_1$, $200_2$. In other words, the various channels are intended to be connected to different first optical fibers $100_i$ and to different second optical fibers $200_i$. The embodiment shown in FIG. 3 differs from the embodiment shown in FIG. 2 in that the slip ring 101' for optical fibers comprises a plurality of optical emitters E1', $102'_1$, E2', $102'_2$ and a plurality of optical detectors D1', $103'_1$, D2', $103'_2$ that are configured and arranged on the first part 110' and the second part 120' so as to allow bidirectional data communication between the first part 110' and the second part 120'. In other words, the data transmission by way of the emitters and receivers is performed bidirectionally in the embodiment of FIG. 3. The first part 110' comprises at least one of said emitters E1' and one of said detectors D2' and the second part 120' comprises at least one of said emitters E2' and one of said detectors D1'. This assembly comprises a plurality of transmission channels, including a first transmission channel C1', called uplink channel, and a second transmission channel C2', called downlink channel, for transmitting data in the opposite direction from the first transmission channel C1'. As a variant, as explained above, at least one of the transmission channels comprises a plurality of emitters and/or a plurality of detectors. The slip ring may also comprise one or more uplink channels and one or more downlink channels.

In FIG. 3, each channel C1', C2' also comprises an optical/electrical converter $111'_1$, $111'_2$ and an electrical/optical converter $121'_1$, $121'_2$ as defined above, intended to be coupled respectively to a first optical fiber $100'_1$, $100'_2$ and to a second optical fiber $200'_1$, $200'_2$.

As a variant, one and the same channel may comprise a plurality of optical detectors, each being linked to an electro/optical converter intended to be coupled to a fiber that is specific thereto. The various detectors of this same channel are connected to different electro-optical converters that are themselves connected to different optical fibers. This makes it possible to achieve redundancy in the detection without redundant emission.

Advantageously, as shown in FIGS. 2 and 3, the slip ring according to the invention comprises a plurality of main data transmission channels, called main channels. Each main channel comprises at least one emitter and at least one receiver. The emitters E1 and E2 or E1' and E2' of the respective main channels C1 and respectively C2 or C1' and respectively C1' of one and the same slip ring are configured so as to emit respective light beams F1 and respectively F2, or F1' and respectively F2', having respective emission peaks, that is to say respective maximum relative radiant powers, at different respective emission wavelengths 2J and respectively λ2 or λ1' and λ2', or are preferably configured so as to emit respective light beams in separate respective frequency bands. The relative radiant power of the emitter at a given wavelength is the ratio between the power radiated by the emitter at this wavelength and the power radiated by the emitter at a reference emission wavelength. In the example of FIG. 2, this means that λ2 is different from λ1, and in the example of FIG. 3, this means that λ1' is different from λ2'. In other words, a wavelength or a frequency band is assigned to each main channel. This means that, if this main channel has a plurality of emitters, these emitters will emit light beams in this frequency band or that have emission peaks at this wavelength and, if this channel has a single emitter, it emits a light beam in this frequency band or that has an emission peak at this wavelength. The wavelengths assigned to the various channels are different, or the frequency bands assigned to the various main channels are separate.

The relative radiant power varies between 0 and 1 and is by definition equal to 1 at the reference emission wavelength. This embodiment is particularly advantageous because it makes it possible to differentiate the signals emitted at reception, even if the emitter of a channel illuminates the detectors of a plurality of main channels. This solution also limits interference between the various data transmission channels. This makes it possible to achieve bidirectional emission, even though the receivers are positioned at a distance from the axis of rotation of the slip ring, or else to simultaneously transmit data coming from various optical fibers in one and the same direction. This embodiment is easy to implement, and it does not require complex means for discriminating the signals originating from the various channels or for preventing the emitter of one channel from jamming the detector of another channel. It tolerates a redundancy on the transmission channel and does not require any strict geometric positioning constraint for separating the light beams.

In one example in which the emitters of the various channels emit on separate respective frequency bands, the emitter E1 of the first channel C1 is configured so as to emit red light and the emitter E2 of the second channel C2 is configured so as to emit blue light.

Advantageously, the detector D1 or D2 (or D1' or D2') of each main channel of one and the same slip ring is configured so as to deliver a second electrical signal generated mainly and preferably solely from the radiation emitted by the emitter of said main channel E1 or respectively E2 (or E1' or respectively E2'). In other words, the signals of the various main channels are discriminated by their respective wavelengths. This makes it possible to recover data conveyed by the first fiber to the second optical fiber without complex processing. If a main channel comprises a plurality of detectors, the detectors of the main channel are configured so as to deliver respective signals generated mainly and preferably solely from the radiation emitted by the emitter or the emitters of said main channel.

Advantageously, the detector or the detectors D1 of each main channel is (are) configured so as to deliver a second electrical signal generated solely from the radiation emitted by the emitter (or the emitters) of the same main channel or the emitters of said main channel. This is achieved for example by transforming only the signal emitted by the emitter of the same channel into an electrical signal. Use is made for example, in one and the same channel, of at least one emitter emitting optical radiation at a predetermined emission wavelength and at least one detector comprising a photodiode equipped with an optical filter allowing through only optical radiation that is substantially at said emission wavelength of the emitter of the channel under consideration. In the abovementioned example, the first detector E1 comprises a red optical filter and the second detector comprises a blue optical filter.

As a variant, the detector of a main channel comprises a photosensitive element (for example a photodiode) having maximum relative spectral sensitivity substantially at the emission wavelength of the emitter of the same channel. The relative spectral sensitivity of a detector varies between 0 and 1. The relative spectral sensitivity of a detector at a reception wavelength is the ratio between the sensitivity of the detector at this wavelength and the sensitivity of the detector at a reference reception wavelength. The relative spectral sensitivity of the detector is equal to 1 at the reference reception wavelength.

Advantageously, the relative spectral sensitivity of a detector of a main data transmission channel is greater than or equal to 0.8 and preferably greater than or equal to 0.9 at the emission wavelength of the emitter (or of the emitters) of the corresponding channel and less than or equal to 0.2 and preferably less than or equal to 0.1 at the emission wavelengths of the emitter (or of the emitters) of the other data transmission channel or of the other main data transmission channels.

Advantageously, the relative radiant power of an emitter of a main channel is greater than or equal to 0.8 and preferably greater than or equal to 0.9 at the wavelength at which the detector(s) of the channel exhibit(s) maximum relative spectral sensitivity and the emitter has a relative radiant power less than or equal to 0.2 and preferably less than or equal to 0.1 at the maximum relative spectral sensitivity wavelength of the detector or detectors of each other main channel.

As a variant or in addition, at least one data transmission channel comprises an electrical filter receiving the second electrical signal delivered by the optical detector. The second signal generated by the detector is then transmitted to the electrical/optical converter via the electrical filter. The electrical filter is for example a bandpass filter. It makes it possible to filter the second signal originating from the detector, for example a photodiode, so as to deliver an electrical output signal that is essentially or preferably only representative of the optical beam emitted by the emitter or emitters of the transmission channel under consideration.

Advantageously, the first signal injected into the emitter of a transmission channel is representative of data conveyed by the first optical fiber and the second signal delivered by the electrical/optical converter of the same channel is representative of the first signal and therefore of said data.

Advantageously, as shown in FIGS. 2 and 3, the optical/electrical converters $111_1$, $111_2$, $111'_1$, $111'_2$ are configured so as to modulate the first electrical signals in terms of intensity. The intensity of each first electrical signal is then representative of data conveyed by the first optical fiber of the channel under consideration. To this end, as shown in FIGS. 2 and 3, the optical/electrical converter comprises, without limitation, an optical/electrical transducer $112_1$, $112_2$ and $112'_1$, $112'_2$ for transforming the optical signal conveyed by the associated first optical fiber into a digital signal and a modulator $113_1$, $113_2$ and $113'_1$, $113'_2$ for transforming the digital signal into an intensity-modulated analog signal (the first electrical signal).

The electrical/optical converter $121_1$, $121_2$, $121'_1$, $121'_2$ comprises, without limitation, a demodulator $122_1$, $122_2$ and $122'_1$, $122'_2$ for transforming the analog signal delivered by the optical detector into an intensity-demodulated digital signal and an electrical/optical transducer $123_1$, $123_2$ and $123'_1$, $123'_2$ for transforming the demodulated signal into the second optical signal intended to be conveyed by the associated second optical fiber. The second optical signal is advantageously representative of the data conveyed by the first optical fiber.

That which has been stated above also applies to the first embodiment.

Each of the converters may comprise one or more amplifiers.

Advantageously, as shown in FIG. 2, at least one of the optical emitters E1, E2 of the slip ring, in this case both of them, is arranged so as to emit a light beam F1, F2, or transmission beam, that intercepts a photosensitive surface Z1, Z2 of the optical detector D1, D2 of the channel comprising said optical emitter E1, E2 regardless of the relative position of the first part 110 and of the second part 120 about the axis of rotation x, from among the possible relative positions between the first part and the second part about the axis of rotation x, such that the channel allows continuous data transmission from the first part 110 to the second part 120. This also applies to the embodiment of FIG. 3, in which at least one of the optical emitters E1', E2' is arranged so as to emit a light beam F1', F2' that intercepts a photosensitive surface Z1', Z2' of the optical detector D1', D2' of the channel comprising said optical emitter E1', E2' regardless of the relative position of the first part 110' and of the second part 120' about the axis of rotation x, from among the possible relative positions between the first part and the second part about the axis of rotation x, such that the channel allows continuous data transmission from the first part 110' to the second part 120'. This makes it possible to continuously transmit data by way of the data transmission channel. There is no masking of the emitter during the rotation of the first part with respect to the second part. This continuous transmission is achieved easily and inexpensively. This solution accepts positioning tolerances of the emitters and of the detectors without the continuity of the data communication between the two parts of the slip ring being affected. Each emitter E1, E2, E1' E2' does not necessarily have an emission axis that is coincident with the axis x or even parallel with the axis x. The photosensitive surface of the associated detector D1, D2 or D1', D2' is also not necessarily parallel with the axis x. The emitter and the detector of one and the same channel may be situated at different distances from the axis of rotation x. This also applies to the other embodiments.

Advantageously, at least one emitter, preferably all of the emitters, are positioned so as to have an emission axis substantially parallel to the axis of rotation x.

Advantageously, at least one optical detector has a photosensitive surface perpendicular to the axis of rotation x. This advantageously applies to all of the detectors.

Advantageously, the emitters and the receivers are positioned at the same distance from the axis of rotation x. This makes it possible to balance the transmission levels between the various channels.

In one variant that applies to each of the embodiments of FIGS. 1 to 3, at least one channel comprises an emitter arranged so as to emit a light beam that intercepts the photosensitive surface of the detector of the same transmission channel only for a portion different from 100% of the possible relative positions between the first part and the second part about the axis of rotation x, so as to form a discontinuous data transmission channel. If the various emitters of the respective channels are positioned at one and the same axial distance from the detectors of the respective channels, this may be achieved using an optical emitter emitting a light beam having a smaller aperture than the other optical emitters. At least the time of reception of the data by the detector of this channel may then be used to estimate a parameter representative of the relative movement between the first parts.

The slip ring comprises for example a computer configured so as to compute a rotational speed of the first part with respect to the second part as a function of the aperture of the light beam emitted by the emitter of the channel, of the relative position of the emitter and of the detector along the axis of rotation, of their respective orientations, of the duration of illumination of the detector by the emitter and of the duration between two successive illuminations of the detector by the emitter.

The slip ring for optical fibers may comprise a plurality of data transmission channels comprising a channel called a main channel and a channel called a redundant channel, said redundant channel being associated with the main channel. It also comprises a selector for selecting the main channel or the redundant channel so as to transmit data from the first fiber to the second fiber solely by way of the channel selected from among the main channel and the redundant channel. The main channel and the redundant channel may thus be set to identical wavelengths without interfering with one another. They may also, that is to say as a variant, be set to different wavelengths, just as described for the various main channels. In the latter case, the selector is not necessary.

When the slip ring comprises a plurality of detectors positioned on one and the same part 110 or 120 of the slip ring, the slip ring may comprise a charge-coupled device or CCD sensor or a complementary metal-oxide-semiconductor or CMOS sensor. The CCD or CMOS sensor may comprise a plurality of detectors or all of the detectors positioned on the same part of the slip ring. These detectors may form the CCD or CMOS sensor.

The slip ring may allow data to be transferred only from the first part to the second part and/or vice versa in a contactless manner by way of optical emitter(s)/detector(s).

Advantageously, the slip ring allows electric power and/or data to be transferred from the first part to the second part and/or vice versa by way of another means. This transfer may advantageously take place at the same time as the data transfer by way of the assembly of at least one optical emitter and the assembly of at least one optical detector.

The additional power and/or data transfer may be performed with contact, for example by way of a slip ring having a brush that creates the electrical contact between the first part 10 and the second part 20. As a variant, the transfer is performed contactlessly. This is achieved for example, without limitation, by way of an inductive transformer. Such a slip ring is shown in FIGS. 2 and 3. This slip ring 101, 101' comprises a transformer 30 comprising a first winding 31 contained in the first part 110, 110' and a second winding 32 contained in the second part 120, 120'. The two windings 31, 32 are magnetically coupled so as to allow electric power to be transferred from the first part 110, 110' to the second part 120, 120' (or vice versa) through mutual induction between the two windings 31, 32. In other words, these two windings form the primary winding and the secondary winding of a transformer.

In the non-limiting embodiments of FIGS. 2 and 3, the first and second parts 110, 120 and 110', 120' are spaced apart from one another along the axis x.

The windings 31 and 32 have winding axes that are substantially coincident with the axis x.

The transformer comprises a magnetic circuit on which the two windings 31, 32 are installed. The magnetic circuit comprises two parts 41, 42 and an air gap 43 separating the two parts 41, 42. The two windings 31, 32 are separated by the air gap 43 along the axis x.

Advantageously, as shown in FIGS. 2 and 3, the second winding 32 is supplied with electric power by way of a power supply 39, which may or may not be contained in the slip ring. The second winding 32 is then a first primary winding of the transformer and the first winding 31 is a first secondary winding of the transformer. Electric power is transmitted from the second part 120, 120' to the first part 110, 110'. This transmission of energy is achieved contactlessly. As a variant, the power supply supplies power to the first winding 31 for a transmission of electric power from the first part 110, 110' to the second part 120, 120'.

Advantageously, in one embodiment, at least one of the optical/electrical converters and/or at least one modulator is supplied with electric power by way of electric power coming from electrical energy generated at the secondary winding of the transformer, so as to establish optical communication between the first part 110 and the second part 120.

The invention also relates to a measurement assembly comprising the slip ring according to the invention and at least one sensor 300 as shown in FIG. 2, for example a hydrophone of an antenna, connected to the same part as the first secondary winding of the transformer 31 (in this case the first part 110 of the slip ring) so as to be driven in rotation by said part about the axis of rotation x with respect to the other part of the slip ring (in this case the second part 120). Advantageously, at least one sensor 300 communicates information from a first optical fiber $100_1$ to a second optical fiber $200_1$ by way of a transmission channel C1 as described above.

At least one sensor 300 is advantageously supplied with electric power by way of the electrical energy delivered by the transformer, for example at the first secondary winding 31 of the transformer 30.

In the embodiments of FIGS. 2 and 3, the slip ring 101, 101' comprises an inductive wireless data transmission channel, that is to say one using the transformer effect, for optical fibers. This channel comprises a third winding 33 of the transformer 30 contained in the first part 110, 110' and a fourth winding 34 of the transformer 30 contained in the second part 120, 120'. The two windings 33, 34 are magnetically coupled so as to allow energy to be transferred from the first part 110, 110' to the second part 120, 120' (or vice versa) through mutual inductance between the two windings 33, 34. This channel comprises an optical/electrical converter 35 and an electrical/optical converter 37. In the non-limiting embodiments of FIGS. 2 and 3, the data transmission is a downlink data transmission. It allows data to be transmitted from the second part 120 to the first part 110. The optical/electrical converter 35 transforms an optical signal delivered by a first additional optical fiber 36 into an electrical signal injected at the terminals of the fourth winding 34 and the electrical/optical converter 37 transforms an electrical signal delivered at the output of the third winding 33 into an optical signal intended to be injected into a second additional optical fiber 38. The third winding performs a role of a second secondary winding and the fourth winding performs a role of a second primary winding of the transformer 30. An uplink transmission of data could be performed. This would be achieved for example by inverting the positions of the two converters 35, 37 and by supplying electric power to the third winding 33, which would then be a second primary winding of the transformer 30. The winding 34 would then be a second secondary winding of the transformer 30.

This type of inductive wireless data transmission has a lower bit rate than optical wireless transmission. It is advantageously used to transmit synchronization data from the first part to the second part (or vice versa). It allows data transmission with a bit rate of one megabit to several tens of megabits. The transformer-effect data transmission channel makes it possible to avoid installing a new optical data transmission channel for emitting the data that are transmitted by this transformer-effect channel, for example the synchronization data.

The data transmitted by way of the transformer-effect data transmission channel are advantageously transmitted to the sensor 300.

The two primary windings 32, 34 of the converter are supplied with power by way of AC voltages having separate frequencies.

Advantageously, as shown in FIGS. 2 and 3, the third and fourth windings 33, 34 are positioned in the air gap 43 of the magnetic circuit 41, 42 of the transformer 30. This makes it possible to at least partly decouple the magnetic circuits of the two winding pairs from the transformer 30 so as to facilitate the simultaneous transmission of power signals and data signals by way of the transformer.

The two windings 33, 34 are spaced from one another along the axis x. These windings 33, 34 are advantageously wound around respective winding axes that are substantially coincident with the axis of rotation x.

As a variant, the slip ring comprises two transformers comprising the two first windings 31, 32 and respectively the two other windings 33 and 34. These two transformers have separate magnetic circuits. This makes it possible to decouple the magnetic circuits associated with these two winding pairs.

Advantageously, the transformer has an air gap at least equal to 1 mm. Optical data transmission exhibits better performance (bandwidth) than magnetic data transmission when the air gap is large, and with a higher bit rate.

Advantageously, the third winding 33 and the fourth winding 34 are planar windings formed in a plane substantially perpendicular to the axis of rotation x. This makes it possible to boost their compactness and thus their positioning in the air gap 43, while at the same time limiting the size of said air gap. As a variant, the windings 33, 34 are non-planar windings.

In the non-limiting embodiments of FIGS. 2 and 3, each part 41, 42 of the magnetic circuit defines a channel 44, 45 surrounding the axis of rotation. These two channels are separated by the air gap 43. The emitters and the detectors are advantageously positioned in these channels 44, 45.

The invention also relates to an optical fiber assembly comprising a slip ring 1 according to the invention. As shown in FIG. 2, the slip ring 1 comprises at least one data transmission channel C1. The optical fiber assembly also comprises the optical fiber $100_1$ that conveys the optical signal received by the data transmission channel C1. The optical fiber assembly may also comprise the other optical fiber $200_1$ onto which the other optical signal generated by the data transmission channel C1 under consideration is injected. In the non-limiting example of FIG. 2, the optical fiber assembly comprises a second transmission channel C2 and the optical fiber $100_2$ conveying the optical signal received by this second channel C2 and possibly the other optical fiber $200_2$ receiving the optical signal delivered by this channel C2. The optical fibers associated with the various channels are different.

The optical fiber assembly advantageously comprises a power slip ring as described above.

The invention also relates to a measurement assembly comprising the optical fiber assembly. The measurement assembly comprises a sensor 300 supplied with power by way of the energy delivered by the transformer 30 of the power slip ring. The optical signal conveyed by at least one optical fiber $100_1$ and that is received by a data transmission channel C1 is advantageously generated from a measurement performed by the sensor 300.

Advantageously, the measurement assembly advantageously comprises a power supply 39 supplying power to a primary winding of the transformer 30 from among the first and second windings 31, 32.

The invention claimed is:

1. A slip ring for optical fibers comprising
a first part;
a second part that is able to rotate with respect to the first part; and
a plurality of data transmission channels, being main channels, wherein each data transmission channel comprising
an optical/electrical converter for transforming an optical signal conveyed by an optical fiber into a first electrical signal,
at least one optical emitter, receiving the first electrical signal so as to emit a light beam, and
at least one optical detector for detecting the light beam and for transforming it into a second electrical signal,
wherein the emitter being contained in the first part and the detector being contained in the second part, or vice versa, and an electrical/optical converter to which the second electrical signal is transmitted such that said electrical/optical converter generates another optical signal intended to be conveyed on another optical fiber,
wherein the emitters of the respective main channels are configured so as to emit light beams having respective emission peaks at different respective emission wavelengths or so as to emit light beams in separate respective emission wavelength bands.

2. The slip ring for optical fibers as claimed in claim 1, wherein the first part is able to rotate with respect to the second part about an axis of rotation, the first part and the second part being remote from one another along the axis of rotation.

3. The slip ring for optical fibers as claimed in claim 1, wherein the optical emitter is arranged so as to emit a light beam directed substantially parallel to the axis of rotation.

4. The slip ring for optical fibers as claimed in claim 1, wherein the optical detectors of the respective main channels are configured so as to deliver respective second electrical signals originating mainly from the radiation of the optical emitters of the respective main channels.

5. The slip ring for optical fibers as claimed in claim 1, wherein the various main channels are intended to transform optical signals conveyed by separate optical fibers and to generate other optical signals conveyed by other separate optical fibers.

6. The slip ring for optical fibers as claimed in claim 1, wherein each main channel comprises a single optical emitter and a single optical detector.

7. The slip ring for optical fibers as claimed in claim 1, comprising at least one main channel and a redundant channel associated with the main channel, and a selector for selecting a channel from among the main channel and the redundant channel so as to transmit data from the first part to the second part, or vice versa, solely by way of the selected channel.

8. The slip ring for optical fibers as claimed in claim 1, wherein the slip ring comprises a plurality of optical emitters and a plurality of optical detectors that are distributed over the first part and the second part so as to allow bidirectional data communication between the first part and the second part.

9. The slip ring for optical fibers as claimed in claim 1, comprising at least one data transmission channel in which an computer is arranged so as to emit a light beam that intercepts a photosensitive zone of at least one optical detector of said data transmission channel regardless of the relative position between the first part and the second part about the axis of rotation from among the possible relative positions between the first part and the second part about the axis of rotation.

10. The slip ring for optical fibers as claimed in claim 1, wherein the first part is able to rotate with respect to the second part about an axis of rotation, and wherein at least one data transmission channel comprises an optical emitter arranged so as to emit a light beam that intercepts a photosensitive surface of the detector of said data transmission channel only for a sub-portion of the possible relative positions between the first part and the second part about the axis of rotation.

11. The slip ring for optical fibers as claimed in claim 10, comprising a computer configured so as to compute a rotational speed of the first part with respect to the second part as a function of the aperture of the light beam emitted by the emitter of the channel, of the relative position of the emitter and of the detector along the axis of rotation, of their respective orientations, of the duration of illumination of the detector by the emitter and of the duration between two successive illuminations of the detector by the emitter.

12. The slip ring for optical fibers as claimed in claim 1, comprising a power slip ring for transferring electrical energy from the first part to the second part or vice versa.

13. The slip ring for optical fibers as claimed in claim 12, wherein the power slip ring comprises a transformer comprising a first winding and a second winding that are magnetically coupled and contained in the first part and the second part respectively, or vice versa, so as to allow energy to be transferred from the first part to the second part or vice versa.

14. The slip ring for optical fibers as claimed in claim 13, wherein the transformer comprises a third winding and a fourth winding that are magnetically coupled and contained in the first part and the second part, respectively, or vice versa, so as to allow data to be transferred from the first part to the second part or vice versa.

15. The slip ring for optical fibers as claimed in claim 14, wherein the transformer comprises a magnetic circuit on which the first winding and the second winding are installed, the magnetic circuit comprising an air gap in which the third winding and the fourth winding are positioned.

16. The slip ring for optical fibers as claimed in claim 15, wherein the second part is able to move in relation to the first part about an axis of rotation, the third winding being formed in a plane substantially perpendicular to the axis of rotation and the fourth winding is formed in another plane substantially perpendicular to the axis of rotation.

17. A measurement assembly comprising a sensor and a slip ring for optical fibers as claimed in claim 13 comprising the optical fiber, the signal conveyed by the optical fiber being generated from a measurement originating from the sensor, said sensor being supplied with electric power by way of electrical energy delivered by the transformer.

18. An assembly comprising a slip ring for optical fibers as claimed in claim 1, said assembly comprising the optical fiber and the other optical fiber.

19. The assembly comprising a slip ring for optical fibers as claimed in claim 5, said assembly comprising the optical fibers and the other optical fibers.

20. The assembly comprising a slip ring for optical fibers as claimed in claim 1, said assembly comprising the optical fiber and the other optical fiber.

21. A slip ring for optical fibers comprising a first part and a second part that is able to rotate with respect to the first part, said slip ring comprising a plurality of data transmission channels, being main channels, wherein each data transmission channel comprising an optical/electrical converter for transforming an optical signal conveyed by an optical fiber into a first electrical signal, at least one optical emitter, receiving the first electrical signal so as to emit a light beam, at least one optical detector for detecting the light beam and for transforming it into a second electrical signal, the emitter being contained in the first part and the detector being contained in the second part, or vice versa, and an electrical/optical converter to which the second electrical signal is transmitted such that said electrical/optical converter generates another optical signal intended to be conveyed on another optical fiber,
  the plurality of data transmission channel comprising at least one main channel and a redundant channel associated with the main channel, and a selector for selecting a channel from among the main channel and the redundant channel so as to transmit data from the first part to the second part, or vice versa, solely by way of the selected channel.

22. An assembly comprising a slip ring for optical fibers as claimed in claim 21, said assembly comprising the optical fiber and the other optical fiber.

23. A slip ring for optical fibers comprising a first part and a second part that is able to rotate with respect to the first part, said slip ring comprising at least one data transmission channel comprising an optical/electrical converter for transforming an optical signal conveyed by an optical fiber into a first electrical signal, at least one optical emitter, receiving the first electrical signal so as to emit a light beam, at least one optical detector for detecting the light beam and for transforming it into a second electrical signal, the emitter being contained in the first part and the detector being contained in the second part, or vice versa, and an electrical/optical converter to which the second electrical signal is transmitted such that said electrical/optical converter generates another optical signal intended to be conveyed on another optical fiber,
  the slip ring for optical fibers comprising a power slip ring for transferring electrical energy from the first part to the second part or vice versa, the power slip ring comprising a transformer comprising a first winding and a second winding that are magnetically coupled and contained in the first part and the second part respectively, or vice versa, so as to allow energy to be transferred from the first part to the second part or vice versa, the transformer comprising a third winding and a fourth winding that are magnetically coupled and contained in the first part and the second part, respectively, or vice versa, so as to allow data to be transferred from the first part to the second part or vice versa.

24. The slip ring for optical fibers as claimed in claim 23, wherein the transformer comprises a magnetic circuit on which the first winding and the second winding are installed, the magnetic circuit comprising an air gap in which the third winding and the fourth winding are positioned.

25. The slip ring for optical fibers as claimed in claim 24, wherein the second part is able to move in relation to the first part about an axis of rotation, the third winding being formed in a plane substantially perpendicular to the axis of rotation and the fourth winding is formed in another plane substantially perpendicular to the axis of rotation.

26. An assembly comprising a slip ring for optical fibers as claimed in claim 23, said assembly comprising the optical fiber and the other optical fiber.

27. A measurement assembly comprising a sensor and a slip ring for optical fibers comprising a first part and a second part that is able to rotate with respect to the first part, said slip ring comprising at least one data transmission channel comprising an optical/electrical converter for transforming an optical signal conveyed by an optical fiber into a first electrical signal, at least one optical emitter, receiving the first electrical signal so as to emit a light beam, at least one optical detector for detecting the light beam and for transforming it into a second electrical signal, the emitter being contained in the first part and the detector being contained in the second part, or vice versa, and an electrical/optical converter to which the second electrical signal is transmitted such that said electrical/optical converter generates another optical signal intended to be conveyed on another optical fiber,
  the slip ring for optical fibers comprising a power slip ring for transferring electrical energy from the first part to the second part or vice versa, the power slip ring comprising a transformer comprising a first winding and a second winding that are magnetically coupled and contained in the first part and the second part respectively, or vice versa, so as to allow energy to be transferred from the first part to the second part or vice versa,
  the measurement assembly comprising the optical fiber, the signal conveyed by the optical fiber being generated from a measurement originating from the sensor, said sensor being supplied with electric power by way of electrical energy delivered by the transformer.

28. A slip ring for optical fibers comprising a first part and a second part that is able to rotate with respect to the first part, said slip ring comprising at least one data transmission channel comprising an optical/electrical converter for transforming an optical signal conveyed by an optical fiber into a first electrical signal, at least one optical emitter, receiving the first electrical signal so as to emit a light beam, at least one optical detector for detecting the light beam and for transforming it into a second electrical signal, the emitter being contained in the first part and the detector being contained in the second part, or vice versa, and an electrical/optical converter to which the second electrical signal is transmitted such that said electrical/optical converter generates another optical signal intended to be conveyed on another optical fiber,
  the first part being able to rotate with respect to the second part about an axis of rotation, and wherein at least one data transmission channel comprises an optical emitter arranged so as to emit a light beam that intercepts a photosensitive surface of the detector of said data transmission channel only for a sub-portion of the possible relative positions between the first part and the second part about the axis of rotation,
  the slip ring comprising a computer configured so as to compute a rotational speed of the first part with respect to the second part as a function of the aperture of the light beam emitted by the emitter of the channel, of the relative position of the emitter and of the detector along the axis of rotation, of their respective orientations, of the duration of illumination of the detector by the emitter and of the duration between two successive illuminations of the detector by the emitter.

29. The assembly comprising a slip ring for optical fibers as claimed in claim 28, said assembly comprising the optical fiber and the other optical fiber.

* * * * *